2,901,726
ECHO RANGING SYSTEMS

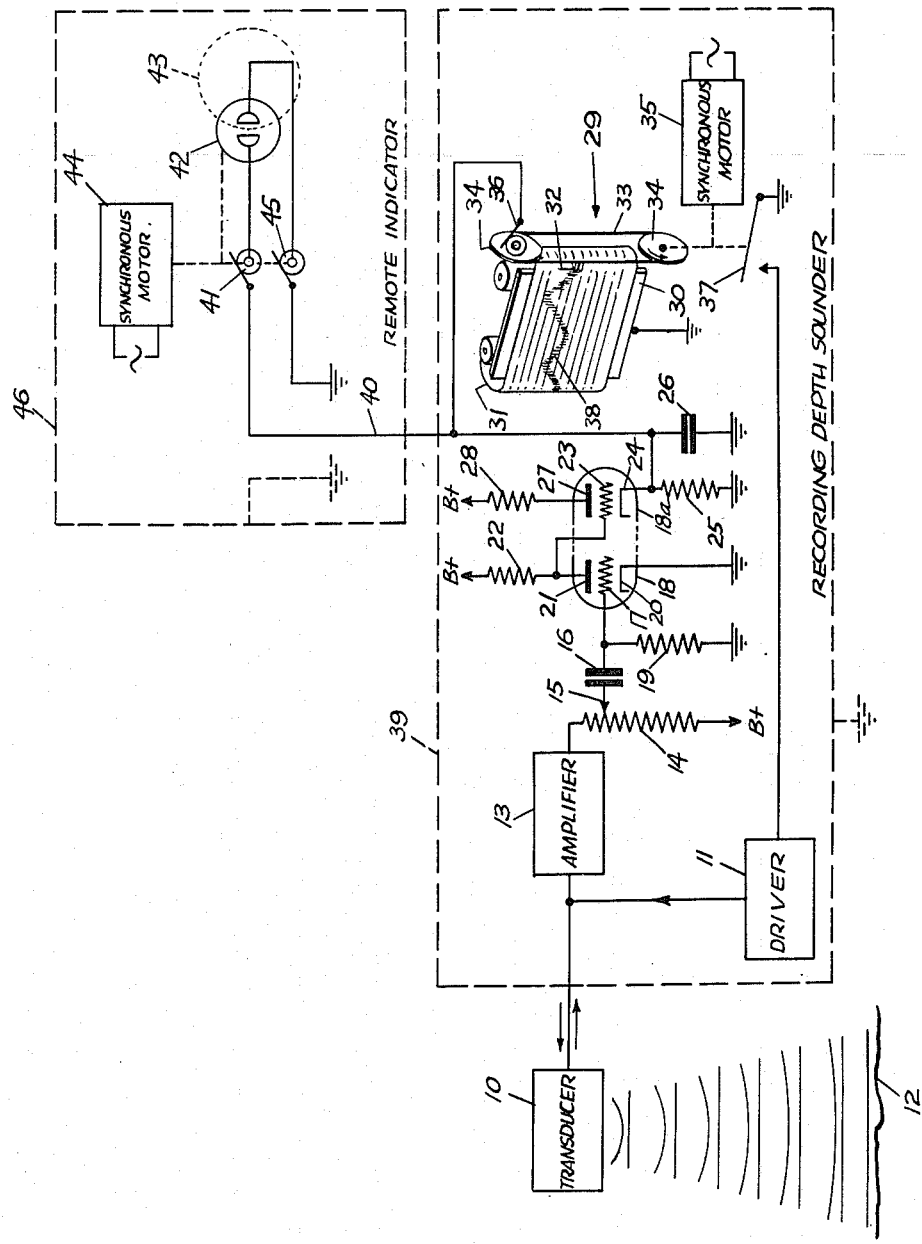

Robert A. Fryklund, Dedham, Mass., assignor to Raytheon Company, a corporation of Delaware Application December 19, 1952, Serial No. 326,906

7 Claims. (Cl. 340—3)

This invention relates to electron discharge systems and more particularly to systems used for echo ranging purposes, such as sonic depth sounders.

In the field of sonic depth sounders it is well known that a pulse of energy may be transmitted from a vessel through the water to a remote object, such as the bottom of the water body or another object moving in the water body, and a reflected echo may be received from the remote object. The reflected echo may be then used in a time measuring system which indicates the elapsed time between the initiation of transmission of the energy pulse through the water and the received echo; this, in turn, indicating the distance to the remote object. Among the well-known types of indicators are the rotating disk carrying a red light and the recording type indicator wherein a stylus produces a mark on electrically sensitive paper. The use of either of these indicating devices has previously required an impedance transformer to produce the necessary voltages to operate the indicators. Furthermore, attempts to operate both types of indicators in parallel from a transformer output were unsatisfactory, since the impedance of the light loaded the output of the transformer to a point where the stylus would not produce clear marks on the sensitive paper.

This invention discloses that a cathode follower may be used to feed either of the aforementioned indicators thereby producing an extremely simple output coupling system which eliminates the need for a transformer. In addition, both indicators may be operated in parallel with indications appearing on both indicators.

This invention further discloses that a grid-leak detector may be used to drive the cathode follower with the anode of the grid-leak detector being connected directly to the grid of the cathode follower, thereby eliminating the conventional coupling condenser and grid load resistor which would otherwise be required.

Other and further objects and advantages of the invention will become apparent as the description thereof progresses, reference being had to the accompanying drawing wherein the single figure illustrates diagrammatically one embodiment of the invention.

Referring now to the drawing, there is shown a transducer 10 which periodically emits a pulse of high intensity directional sonic energy in response to an impulse from a driver 11, which is connected thereto. The returning echoes from the remote object, such as the bottom 12, are picked up by the transducer 10 and are fed through an amplifier 13, the output of which is shown here by the way of example, as the potentiometer 14. The variable tap 15 of potentiometer 14 is connected through a coupling condenser 16 to the grid 17 of a grid-leak detector comprising one half 18 of a duo-triode. Grid 17 is also connected to ground through a grid load resistor 19. The cathode 20 of triode 18 is connected to ground. The plate 21 of triode 18 is connected to B+ through a plate load resistor 22 and to the grid 23 of the other half 18a of the duo-triode. The cathode 24 of triode 18a is connected to ground through a cathode load resistor 25, which may be bypassed, if desired, by a bypass condenser 26. The plate 27 of triode 18a is connected to B+ through a plate current limiting resistor 28. The values of condenser 16 and resistor 19 are adjusted to have a long time constant with respect to a period of oscillation of the transducer 10, but are short with respect to the repetition rate of the keyer 11. As a result, the returned echoes applied to the triode half 18 through the amplifier 13 and condenser 16 are rectified by grid rectification due to the drawing of grid current by the grid 17 and are substantially filtered by the filtering action of condenser 16 and resistor 19 according to well-known grid-leak detecting practice. The rectified signal appears at the plate 21 across the plate load 22, where the high frequency peaks may be bypassed to ground according to standard grid-leak detector practice by a condenser (not shown), and is directly coupled to the grid 23 of the cathode follower triode section 18a.

The output of the cathode follower is connected to a recording indicator generally indicated at 29, which may be, for example, of the type disclosed in my copending application, Serial No. 119,905, filed October 6, 1949, now Patent No. 2,715,055. Briefly, such an indicator has a metal backing member 30 which is grounded and across which the record paper 31 is drawn. The output of cathode follower 18a is fed to a stylus 32, carried by an endless conductive belt 33 riding on pulleys 34 driven by a synchronous motor 35, by means of a brush 36 contacting one of the pulleys 34.

The motion of the stylus 32 across the paper 31 is synchronized with the operation of the switch 37, which is periodically closed when the stylus 32 is substantially at the top of the paper 31. Closure of switch 37 keys the driver 11, thereby producing an output pulse which energizes the transducer producing the transmitted pulse of sonic energy. The returning echoes appearing as impulses at the cathode 24 of the cathode follower are fed to the stylus 32, thereby producing markings as at 38 under the stylus 32 thus indicating the distance traveled by the sonic energy.

The chassis of the recording depth sounder indicated at 39 acts as ground, and hence as the return path for the signals of the various circuits.

The output of the cathode follower may also be fed, for example, by line 40 to a remote indicator, which may be, for example, of the rotating red light type disclosed in my copending application, Serial No. 220,684, filed April 12, 1951, now Patent No. 2,845,513, line 40 being connected through a slip ring 41 to one side of a neon lamp 42, which is rotated in a circle illustrated diagrammatically at 43 by a synchronous motor 44, which is synchronized with the synchronous motor 35 in the recording depth sounder. The other side of the neon lamp 42 is connected through a second slip ring 45 to ground. The chassis 46 of the remote indicator may also serve as ground for the circuits of that system. Thus it may be seen that, by the use of a cathode follower type of output, one of the sliding electrical contacts in the red light indicating system may be at ground potential, thereby minimizing the insulation requirements of the device.

This completes the description of the particular embodiment of the invention illustrated herein. However, many modifications thereof will be apparent to persons skilled in the art without departing from the spirit and scope of this invention. For example, the sensitivity potentiometer 14 may be placed in the grid circuit of the amplifier 13 rather than the output circuit thereof; the limiting resistor 28 in the plate circuit of the cathode follower may be made adjustable to adjust the limit of the current therethrough and, hence, the limiting of the output signal excursion or, if desired, the resistor 28 may be eliminated altogether and the anode 27 may be connected directly to B+. In addition, the condenser 26 may be eliminated if desired. Accordingly, it is desired that this invention be not limited to the particular details of the embodiment illustrated and described herein except as defined by the appended claims.

What is claimed is:

1. An electron discharge system comprising a source of signals, a grid leak detector, a cathode follower directly coupled to said detector, and a recording indicator and flashing light indicator both coupled directly to the cathode electrode at the output of said cathode follower.

2. An electron discharge system comprising a grid leak detector, a D.-C. amplifier having a D.-C. bias applied thereto by connection of the input electrode of said amplifier through a D.-C. path to the output electrode of said detector to provide a predetermined D.-C. voltage level at the output electrode of said amplifier, a voltage-sensitive indicator connected through a D.-C. path directly to said output electrode of said amplifier, said indicator being energizable at a D.-C. level greater than said predetermined D.-C. level, a source of signals connected to the input electrode of said detector whereby said signals are rectified and amplified by said detector, said amplifier being responsive to the output of said detector for generating output signals to change said predetermined D.-C. level and, thereby, to energize said indicator.

3. An electron discharge system comprising a detector including elements connected between the grid and ground for accomplishing grid-leak detection, an amplifier having a D.-C. bias applied thereto by connection of the input of said amplifier through a D.-C. path to the output of said detector to provide a predetermined D.-C. voltage level at the cathode of said amplifier, an indicator directly connected to the cathode of said amplifier, and a source of signals connected between said grid and ground of said detector whereby said signals are rectified and amplified by said detector, said amplifier being responsive to the output of said detector for generating signals to change said D.-C. voltage level and, thereby, to energize said indicator.

4. An electron discharge system comprising a detector including elements connected between the grid and ground for accomplishing grid-leak detection, an amplifier having a bias voltage applied thereto by connection of the input of said amplifier through a D.-C. path to the output of said detector, said bias voltage having a magnitude dependent upon the zero-signal operating point of said detector, an indicator directly connected to the cathode of said amplifier and having applied thereto a D.-C. voltage dependent on said bias voltage, and a source of signals connected between said grid and ground of said detector whereby said signals are rectified and amplified by said detector, said amplifier being responsive to the output of said detector for generating signals to change said D.-C. voltage and, thereby, to energize said indicator.

5. An electron discharge system comprising a detector including in a grid to ground input circuit a capacitor and an impedance for accomplishing grid-leak detection, an amplifier having a bias voltage applied thereto by connection of the input of said amplifier through a D.-C. path to the output of said detector, said bias voltage having a magnitude dependent upon the zero-signal operating point of said detector, a plurality of voltage-sensitive indicators directly connected to the cathode of said amplifier and having applied thereto a predetermined D.-C. voltage dependent on said bias voltage, and a source of signals connected to said input circuit for generating output signals for said amplifier of sufficient amplitude to change the D.-C. voltage at said cathode for energization of said indicators.

6. An electron discharge system comprising a source of pulse signals having a predetermined time interval between pulses, a detector, a network connected to the input of said detector for accomplishing grid leak detection, said network being responsive to said pulse signals and having a time constant substantially less than the time interval between said pulse signals, a cathode follower directly coupled through a D.-C. path to said detector, and a recording indicator and flashing light indicator both coupled directly through a D.-C. path to the cathode electrode at the output of said cathode follower.

7. A pulse-echo system comprising a source of pulse signals, an echo receiver including a detector having a filter network whose time constant is substantially less than the time interval between said pulse signals for detecting echo signals derived from said pulse signals, a D.-C. amplifier having a D.-C. bias applied thereto by connection of the input of said amplifier through a D.-C. path to the output of said detector to provide a predetermined D.-C. voltage level at the output of said amplifier, and a voltage-sensitive indicator connected through a D.-C. path directly to said output of said amplifier, said indicator being energizable at a D.-C. level greater than said predetermined D.-C. level, said echo signals being fed to the input of said detector whereby said signals are rectified by said detector, and said amplifier being responsive to the output of said detector for generating output signals to change said predetermined D.-C. level and, thereby, to energize said indicator.

References Cited in the file of this patent

UNITED STATES PATENTS

| | | |
|---|---|---|
| 2,157,856 | Koch | May 9, 1939 |
| 2,465,990 | Anderson | Apr. 5, 1949 |
| 2,466,711 | Kenyon | Apr. 12, 1949 |
| 2,467,202 | Gardiner | Apr. 12, 1949 |
| 2,502,938 | Fryklund | Apr. 4, 1950 |
| 2,509,208 | Busignies et al. | May 30, 1950 |
| 2,510,687 | De Vore | June 6, 1950 |
| 2,538,487 | Volkers | Jan. 16, 1951 |
| 2,538,488 | Volkers | Jan. 16, 1951 |
| 2,710,787 | Witt | June 14, 1955 |
| 2,714,136 | Greenwood | Aug. 2, 1955 |
| 2,736,774 | Robinson | Feb. 28, 1956 |
| 2,788,509 | Bolzmann | Apr. 9, 1957 |

OTHER REFERENCES

Gray: Applied Electronics (2nd ed.), 1943, John Wiley & Sons, Inc., p. 715.

Landee: Electronic Designers' Handbook, McGraw-Hill Book Co., Inc., 1957, pp. 7-93.

Seeley: "Electron Tube Circuits," p. 343, 1950.